United States Patent [19]

String et al.

[11] Patent Number: 5,312,549
[45] Date of Patent: May 17, 1994

[54] METHOD AND APPARATUS FOR EXTRACTING ORGANIC LIQUIDS FROM AN ORGANIC LIQUID SOLUTE/SOLVENT MIXTURE

[75] Inventors: Darrell String, Parkton, Md.; Arun Lakhani, Audubon, Pa.

[73] Assignee: Clean Harbors, Inc., Quincy, Mass.

[21] Appl. No.: 17,122

[22] Filed: Feb. 12, 1993

[51] Int. Cl.⁵ .................................... B01D 11/00
[52] U.S. Cl. ......................... 210/634; 210/195.1
[58] Field of Search ............... 203/50; 210/634, 511, 210/259, 195.1

[56] References Cited

U.S. PATENT DOCUMENTS

| | | | |
|---|---|---|---|
| 3,882,018 | 5/1975 | Depree | 210/20 |
| 3,898,042 | 8/1975 | Webb et al. | 23/230 R |
| 3,931,007 | 1/1976 | Sugano et al. | 210/50 |
| 3,997,439 | 12/1976 | Ayukawa | 210/50 |
| 4,053,553 | 10/1977 | Reinhardt et al. | 423/139 |
| 4,066,542 | 1/1978 | Ayukawa | 210/51 |
| 4,097,377 | 6/1978 | Ayukawa | 210/50 |
| 4,116,705 | 9/1978 | Chappell | 106/90 |
| 4,120,780 | 10/1978 | Morimoto et al. | 208/211 |
| 4,151,077 | 4/1979 | Nogueira et al. | 210/21 |
| 4,193,854 | 3/1980 | Drnevich et al. | 204/149 |
| 4,230,568 | 10/1980 | Chappell | 210/751 |
| 4,256,587 | 3/1981 | Carnahan et al. | 210/670 |
| 4,256,630 | 3/1981 | Fremont | 260/122 R |
| 4,329,224 | 5/1982 | Kim | 210/709 |
| 4,338,199 | 7/1982 | Modell | 210/721 |
| 4,349,415 | 9/1982 | DeFilippi et al. | 203/14 |
| 4,356,000 | 10/1982 | Chappell | 44/1 D |
| 4,362,629 | 12/1982 | Senda et al. | 210/714 |
| 4,375,387 | 3/1983 | DeFilippi et al. | 202/169 |
| 4,395,367 | 7/1983 | Rohrmann et al. | 252/629 |
| 4,486,391 | 12/1984 | Hashimoto | 423/9 |
| 4,543,190 | 9/1985 | Modell | 210/721 |
| 4,549,966 | 10/1985 | Beall | 210/661 |
| 4,578,195 | 3/1986 | Moore et al. | 210/679 |
| 4,737,315 | 4/1988 | Suzuki et al. | 252/632 |
| 4,741,831 | 5/1988 | Grinstead | 210/638 |
| 4,765,257 | 8/1988 | Abrishamian et al. | 110/342 |
| 4,765,834 | 8/1988 | Ananthapadmanabbbhan et al. | 75/108 |
| 4,770,780 | 9/1988 | Moses | 210/634 |
| 4,781,841 | 11/1988 | Someya | 210/747 |
| 4,820,647 | 4/1989 | Gibbons | 436/79 |
| 4,822,497 | 4/1989 | Hong et al. | 210/721 |
| 4,848,918 | 7/1989 | Kingsley et al. | 366/262 |
| 4,863,580 | 9/1989 | Epner | 204/269 |
| 4,872,993 | 10/1989 | Harrison | 210/666 |
| 4,877,530 | 10/1989 | Moses | 210/511 |
| 4,882,067 | 11/1989 | Johnson et al. | 210/688 |
| 4,888,053 | 12/1989 | Grayson et al. | 75/101 R |
| 4,888,098 | 12/1989 | Nyberg et al. | 204/1 R |
| 4,956,052 | 9/1990 | Hirata et al. | 203/50 |

Primary Examiner—Frank Spear
Attorney, Agent, or Firm—Weingarten, Schurgin, Gagnebin & Hayes

[57] ABSTRACT

A process and apparatus for efficiently and economically separating organic chemicals, that have an affinity for water and carbon dioxide, from water using liquefied carbon dioxide extraction. A secondary reboiler with external heating capacity improves the separation of carbon dioxide, for reuse, from extracted organic compounds. The secondary reboiler comprises a boiler heated by an external heat source, such as steam. The secondary reboiler is fed liquid from a primary or vapor recompression reboiler and returns vapor to the primary reboiler. Addition of the secondary reboiler permits the primary vapor recompression apparatus to be operated at a lower temperature and to use the recompressed still overhead vapors for heat. Secondary heating provided by the secondary reboiler improves separation by providing an additional equilibrium stage of separation, thus the stream drained from the secondary reboiler has a much lower concentration of the extractant fluid.

4 Claims, 4 Drawing Sheets

METHOD AND APPARATUS FOR EXTRACTING ORGANIC LIQUIDS FROM AN ORGANIC LIQUID SOLUTE/SOLVENT MIXTURE

FIELD OF THE INVENTION

The present invention relates to a process and apparatus for extracting organic compounds from solution, and more particularly to a process and apparatus using near or super critical fluid to extract organics from aqueous streams.

BACKGROUND OF THE INVENTION

It is known to use near or supercritical carbon dioxide as an extractant (i.e. liquified vapor near or above its critical point used to extract impurities from an aqueous stream), to extract certain liquid organic solutes from their solvents. U.S. Pat. Nos. 4,349,415 and 4,375,387 disclose respectively, a process and apparatus for separating organic liquid solutes from their solvent mixtures, using liquid carbon dioxide as an extractant. The process and apparatus include a liquid-liquid extraction column and a distillation column having a single reboiler which receives heat provided through indirect heat exchange with recompressed vapor drawn from the overhead of the distillation column. The process as particularly described yields an aqueous raffinate (i.e. water or aqueous stream after purification), via countercurrent contact of upwardly flowing liquified carbon dioxide with a water/ethyl alcohol mixture.

A stated objective of the referenced patents is the reduction of the required energy input per unit of organic liquid extracted. These patents propose reduced energy consumption in recovering and recycling extractant, via a process and apparatus that uses solvent extractant vapor recompression and the enthalpy of overhead vapors from the distillation column as the source of reboiler heat.

However, while acknowledging the desirability of recovering and recycling the extractant used in the process of extracting organics, the referenced patents assume and essentially require minimal boiling point elevation of the solvent/organic(s) matrix involved in the distillation process. In exclusively using carbon dioxide as the extractant and ethyl alcohol as the liquid organic solute (i.e. organic stream that remains after extraction and removal of the extractant), the referenced patents rely heavily on favorably low boiling point elevation resultant from the presence of the solute. The prior art effectively dismisses as uneconomical, the processing of organic chemicals whose colligative properties with carbon dioxide result in a significant boiling point elevation of the solvent/solute mixture (referred to hereinafter "subject mixtures").

The referenced patents, and the prior art generally, do not contemplate or substantiate the efficiency of carbon dioxide extraction in processing organic chemicals that result in substantial boiling point elevations of solvent/solute mixtures. Although it is generally appreciated that separation and reuse of carbon dioxide is critical in a plant-scale liquid carbon dioxide extraction facility, prior art technology cannot process the subject mixtures, such as acetone/water, without the excessive loss of carbon dioxide with the extracted organics.

Thus, known carbon dioxide extraction processes are inadequate for processing a variety of organic compounds that are miscible with carbon dioxide and interfere with efficient distillation and recovery of the heat of vaporization and recompression. Prior art technology cannot adequately, effectively and/or economically extract important compounds, such as acetone or the like, in a liquid-liquid carbon dioxide extraction process where solvent reuse is desirable and where the subject mixtures appreciably elevate the boiling point of the solution.

SUMMARY OF THE INVENTION

The present invention provides a process and apparatus for efficiently and economically separating organic compounds, that have an affinity for water and carbon dioxide, from water using liquefied carbon dioxide extraction.

According to the invention, addition of a secondary reboiler with external heating capacity improves separation of carbon dioxide from the extracted organic compounds, to enable economical reuse of the carbon dioxide extractant. The secondary reboiler comprises a boiler heated by an external heat source, such as steam. The secondary reboiler is fed liquid from a primary or vapor recompression reboiler and returns vapor to the primary reboiler. Addition of the secondary reboiler permits the primary reboiler and associated primary solvent recovery column to be operated at a lower temperature and to use the recompressed still overhead vapors for heat. Secondary heating provided by the secondary reboiler improves separation by providing an additional equilibrium stage of separation, thus the stream drained from the secondary reboiler has a much lower concentration of extractant than would be drawn from the primary reboiler.

Features of the invention include fast and effective processing of organics that have an affinity for carbon dioxide and water. Secondary heating improves solvent/solute separation and greatly reduces total energy costs. The process and apparatus according to the invention facilitate: maximized recovery of extraction fluid; enhanced reuse of system enthalpy to provide energy to distill the extraction fluid; and superior processing of organic compounds that tend to reduce the vapor pressure in the distillation column.

DESCRIPTION OF THE DRAWINGS

These and other features and advantages of the present invention will become more apparent in light of the following detailed description of an illustrative embodiment thereof, taken in conjunction with the accompanying drawings, of which:

FIG. 2b is a partial schematic diagram of another portion of the apparatus of FIG. 2a.

DETAILED DESCRIPTION

Figure 1:
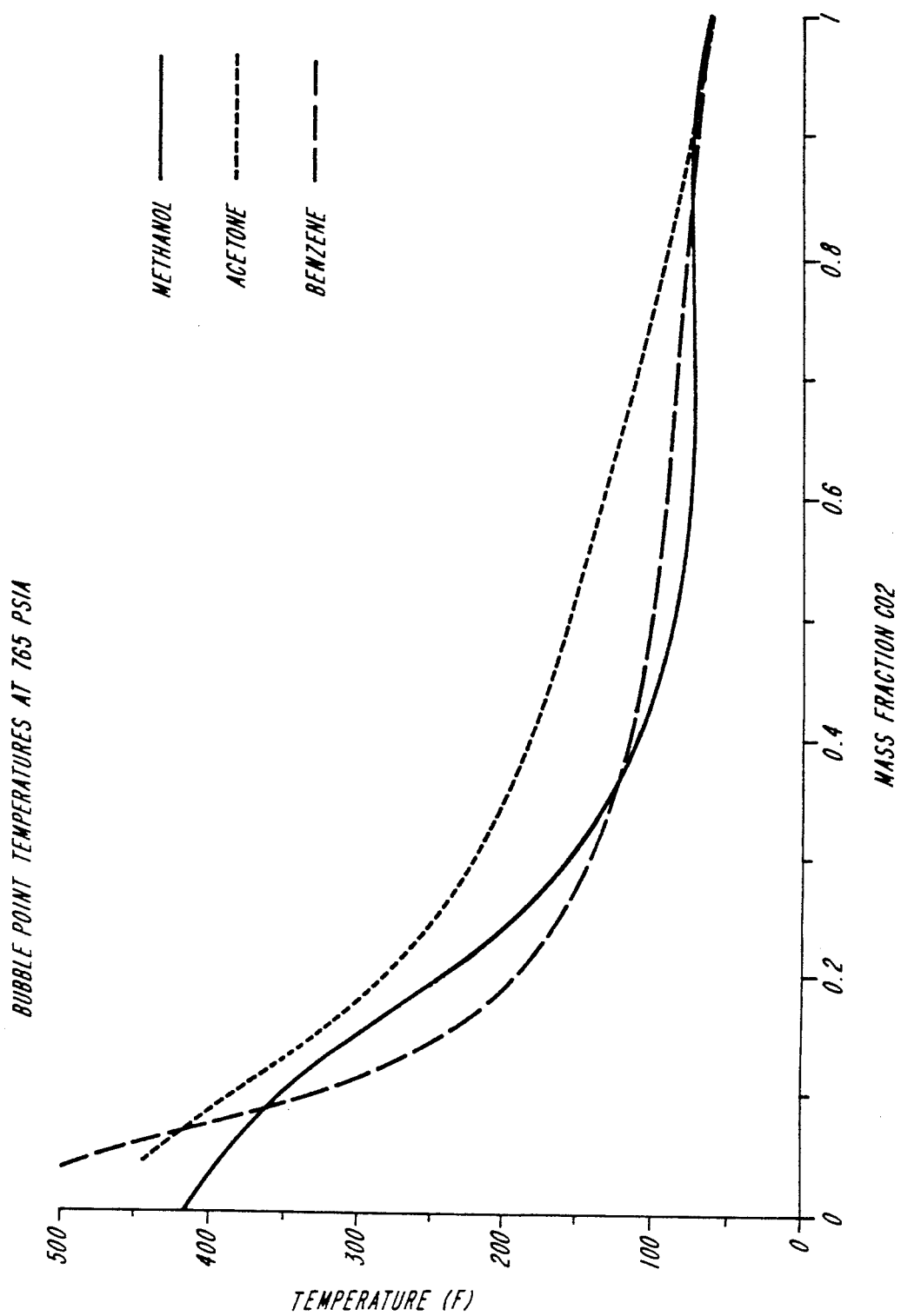
FIG. 1 is a plot of boiling point temperature versus weight percent carbon dioxide illustrating relative characteristics of methanol, acetone and benzene.

Many compounds which are gases (or liquids) at ambient temperature and pressure can be converted to supercritical fluids by subjecting them to conditions above their critical pressures and temperatures. At pressures and/or temperatures somewhat below the critical points, most of the gases may be liquified to attain what is termed their near-critical state. These gases in their near-critical liquid or supercritical fluid state become good solvents for many organic materials. It is therefore possible to refer to them as being in a solvent condition, i.e. having good extraction properties, lowered viscosity, greatly enhanced solvency and immiscibility with raffinate. The actual temperature and pressure for any one fluid to be in its solvent condition is readily determinable.

Liquid carbon dioxide ($CO_2$) is the solvent extractant used in the illustrative embodiment of the present invention, however it should be appreciated that the process and apparatus described herein is applicable in various critical fluid applications and with various solutes that cause solution boiling point elevation. Liquid $CO_2$ near the critical point is largely a nonpolar material and exhibits liquid-liquid extraction properties similar to toluene. Vapor-Liquid Equilibrium (VLE) of the binary $CO_2$/acetone extractant mixture demonstrates the requirements for temperatures above that supplied by vapor recompression to effectively separate $CO_2$ in the distillation column. Other ternary systems as well, were evaluated to determine system energy requirements.

A physical property data base was developed for a multi-component system including $CO_2$/acetone/methanol. An equation-of-state approach was used integrating a modified Redlich-Kwong equation programmed into ASPEN PLUS, a proprietary product of Aspen Technology, Inc. This equation is also known as the Redlich-Kwong UNIFAC equation:

$$P = \frac{RT}{v - b_m + c_m} - \frac{a_m}{(v + c_m)(v + b_m + c_m)}$$

This equation is similar in principle to the modified Peng-Robinson equation used by panagoitopoulos and Reid ("Equation of State Theories and Applications", Robinson, R. L. and Chao, K. C. (eds.), American Chemical Society Symposium Series No. 300, pp. 571–582; American Chemical Society, Washington, D.C., 1986) in their study of the $CO_2$/acetone/water system, which is incorporated herein by reference.

Phase equilibrium for a multicomponent system can, in general, be reliably calculated provided that good binary parameters are available for all of the pairs. Low pressure (atmospheric pressure and below) experimental vapor/liquid data were available in DECHEMA for the acetone/water binary combination. These data were used rather than high-pressure data because these parameters are available at the temperatures of interest rather than at the pressures of interest. If high-pressure binary data for the system had been used, the temperatures would not have been in the range of interest. These data were regressed and the parameters used in the high-pressure supercritical extraction process.

High-pressure vapor-liquid extraction data were available for $CO_2$/water over the range of 0° to 50° C. (R. Wiebe, Chem. Rev. 29, 475–481 (1941) incorporated herein by reference). The parameters developed for $CO_2$/water from the boiling point data were tested to see if liquid-liquid extraction data could be predicted. Reasonable agreement with experimental data (Francis, J. Phys. Chem. 58, 1099 (1954) incorporated herein by reference) was obtained. Parameters for the acetone/water binary system were developed from the low-pressure acetone/water data in DECHEMA. The experimental ternary data for $CO_2$/acetone/water were regressed with the previously determined parameters for $CO_2$/water and acetone/water fixed.

Computer-generated plots for $CO_2$/acetone were created at the temperatures used by Panagiotopoulos and Reid. The parameters that had been developed for $CO_2$/acetone, $CO_2$/water, and acetone/water were also used to predict the ternary liquid-liquid equilibrium and checked against previously published data of Francis (1954) supra.

FIG. 1 is a plot of the boiling point temperature versus weight percent $CO_2$ with methanol, acetone and benzene. With a binary system of solvents, the three curves indicate that at approximately 100° F., the composition would contain 42 wt % $CO_2$ if methanol were the only other material present, 47 wt % $CO_2$ if benzene were the only other material present, and 74 wt % $CO_2$ if acetone were the only other material present. These results suggest that for a concentration of solute, a higher temperature is needed to vaporize a matrix having $CO_2$/acetone, than is required for either $CO_2$/methanol, or incidently, $CO_2$/benzene.

Due to the affinity of acetone for $CO_2$, the solution boiling point of a $CO_2$/acetone mixture is significantly elevated thereby requiring increases in the temperature needed to distill the $CO_2$ for reuse. As discussed hereinbefore, processes and apparatus known in the art are inadequate, relying on favorably low boiling point elevation, and thus impracticable and uneconomical. To provide the significant increase in temperature needed to distill the carbon dioxide, for reuse, from the subject mixtures, a secondary reboiler is added to the extraction fluid distillation apparatus according to the invention. Enthalpy for the secondary boiler is provided by an external heat source, such as steam.

Figure 2A:
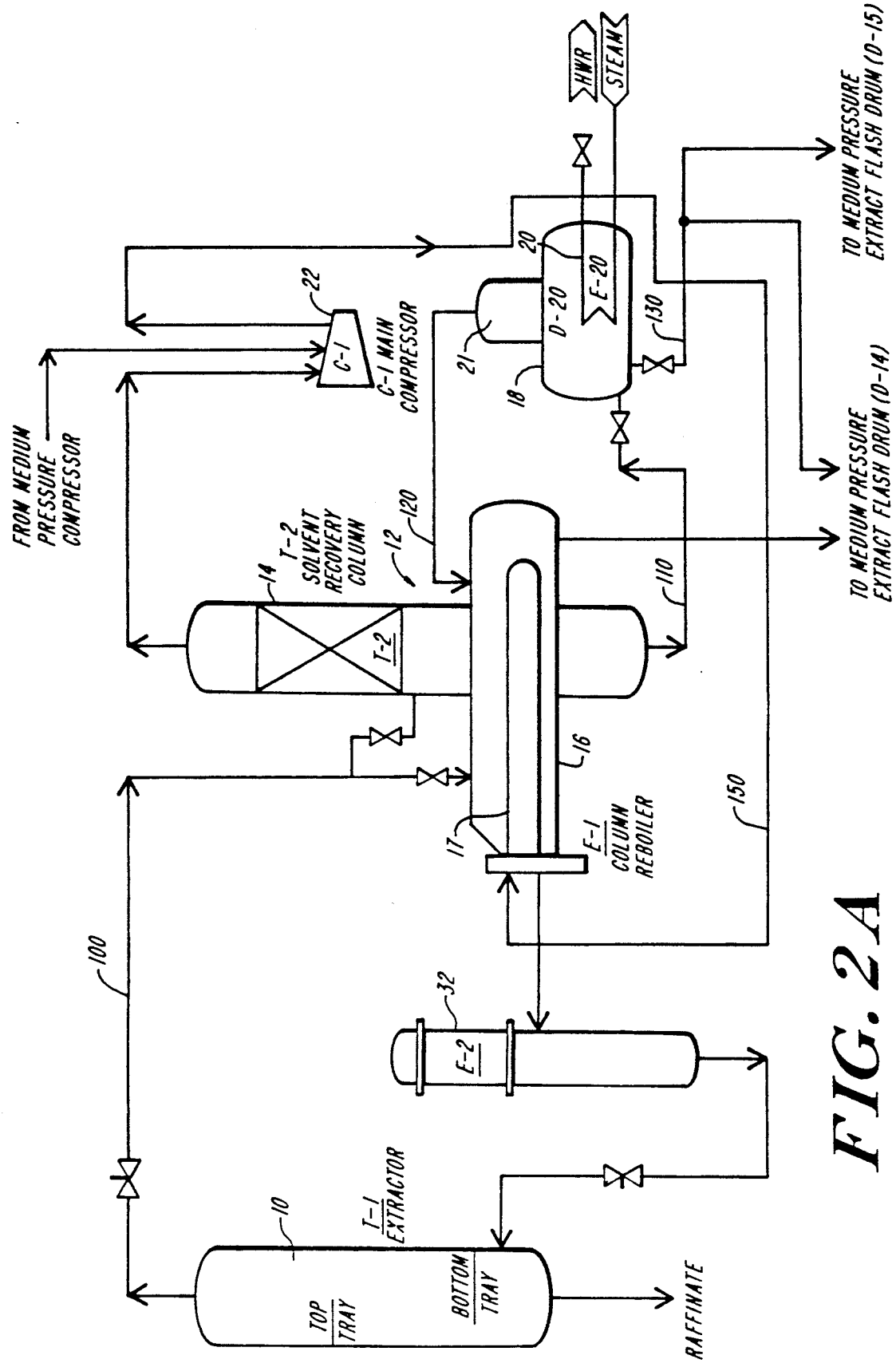
FIG. 2a is a partial schematic diagram of a portion of an apparatus including a secondary reboiler for processing organic liquids according to the invention.
Figure 2B:
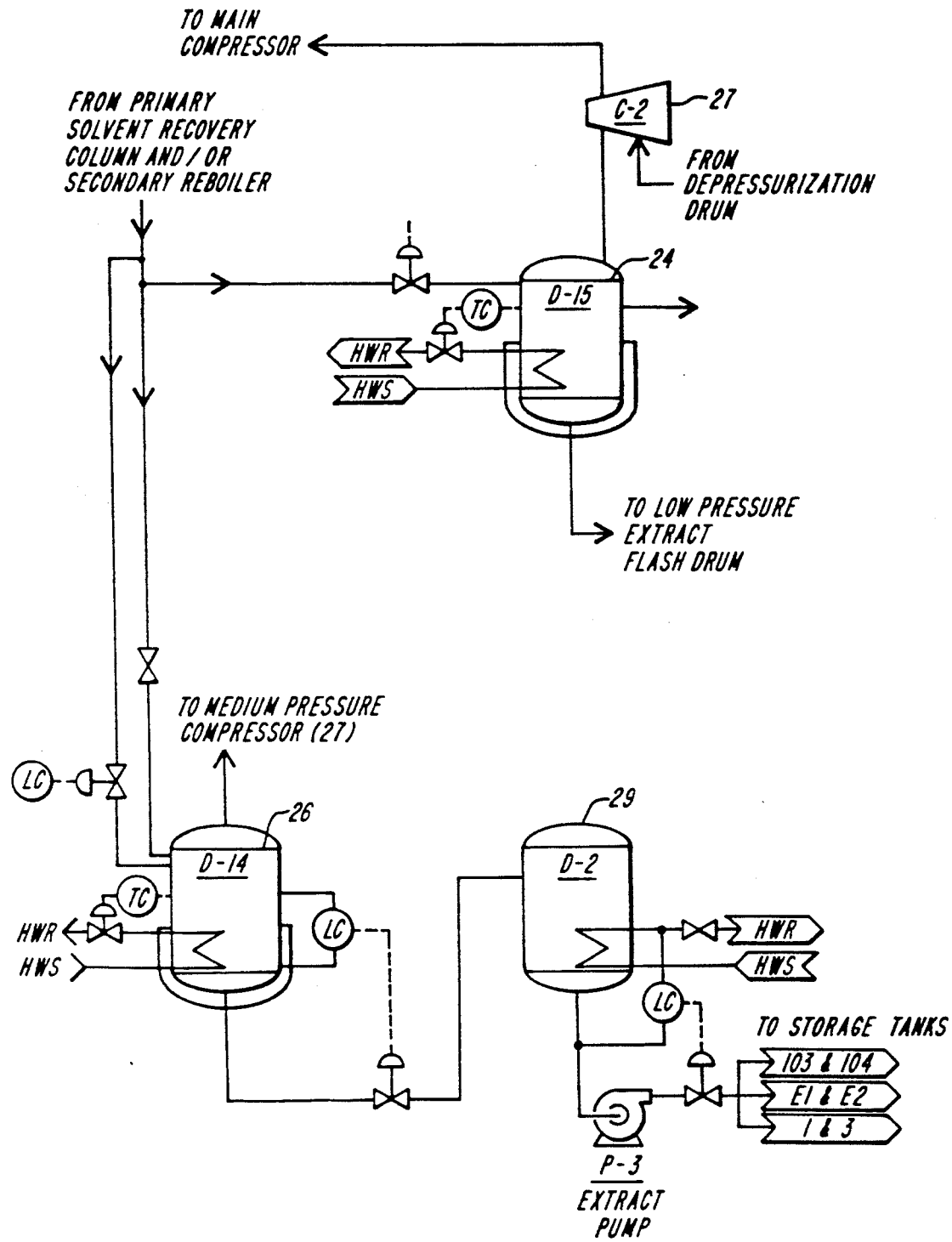

Referring now to FIGS. 2a and 2b, an illustrative embodiment of a process and apparatus according to the present invention extracts organics, such as acetone or the like, from water with high pressure liquid $CO_2$ in an extraction tower 10. Again, it should be appreciated that the process and apparatus described herein are applicable in various critical fluid applications and with various solutes that cause solution boiling point elevation. The process generally involves pretreatment of a waste stream, and various other processing considerations, which are known and disclosed in commonly assigned U.S. Pat. No. 5,087,370 and allowed U.S. Pat. application Ser. No. 07/794,287, which are incorporated herein by reference. The extraction function commences in the tower 10 upon countercurrent contact of $CO_2$ with the acetone laden waste stream. The upwardly flowing near critical $CO_2$ strips the acetone from the downwardly flowing stream and exits the top of the extraction tower 10 for further processing in a primary vapor recompression apparatus 12 having a solvent recovery distillation column 14. Typically, 30 gallons per minute (GPM) liquid $CO_2$ with typically 2 to 5% acetone concentration flow continuously from the top of the extraction tower 10. The $CO_2$ stream from the extraction tower 10 flows through flow line 100 into a reboiler portion 16 of the primary solvent recovery apparatus 12. The primary reboiler 16 and associated solvent recovery column 14 operate, below the critical point, at a pressure about 200 psi below that of the extraction tower 10. The lowered pressure in combination with added heat from a solvent recovery column heat exchanger 17 within the reboiler 16 results in vaporization of $CO_2$. The vaporized $CO_2$ flows up and out of the primary distillation column 14.

The extracted acetone and liquid $CO_2$ that remains in the bottom of the primary vapor recompression apparatus 12 drains by gravity through feed line 110 into a vessel of a secondary reboiler 18, discussed hereinafter. The composition at this point is approximately 8%–30% acetone and 70%–92% $CO_2$. In this illustrative embodiment, the conditions in the solvent recovery column 14 of the primary vapor recompression apparatus are approximately 750 PSIG and 76° F. Solvent recovery column level controls (not shown), maintain liquid level in the primary recovery column 14 and the secondary reboiler 18 to keep heating coils submerged.

A steam heater 20 is located inside the secondary reboiler vessel 18. The secondary reboiler steam heater 20 adds enthalpy and thereby evaporates additional $CO_2$. The $CO_2$ vapor from the secondary reboiler 18 passes up a secondary reboiler column 21 and returns to the primary vapor recompression apparatus 12 through line 120 and increases the flow out of the primary recovery column 14 to a main compressor 22. The liquid remaining in the secondary reboiler vessel 18 will typically be 30–50% acetone at approximately 110°–160° F.

In this illustrative embodiment, the secondary reboiler 18 is comprised of a TEMA (Tubular Exchanger Manufacturers Association) class B, type BKU heat exchanger with two tube passes and a single pass shell. The reboiler 18 is configured to pass steam and exchange heat at a maximum rate of 675,193 BTU/hr, having a shell inside diameter of approximately 11 inches and 40 U-shaped tubes with a tube length of approximately 4.75 feet. The reboiler 18 is configured for the illustrative embodiment described herein and it will be appreciated that alternative secondary energy sources can be implemented.

The liquid from the secondary reboiler vessel 18 is drained through line 130 to a first extract depressurization drum 24 and a second extract depressurization drum 26 (FIG. 2b). The pressure in the extract depressurization drums 24, 26 is lowered to 120 PSIG, and most of the remaining $CO_2$ vaporizes to a medium pressure compressor 27 for recovery through the primary vapor recompression apparatus 12. Subsequently the extract flows from the medium pressure extract depressurization drums 24, 26 to low pressure extract drum(s) 29. Any residual $CO_2$ is vaporized in the low pressure extract drums 29 and recycled/recompressed for reuse within the process. The depressurized, substantially extractant free extract is pumped to tanks for storage and disposal.

The $CO_2$ vapors from the primary distillation column 14, plus vapor flow from the secondary reboiler column 21, and the medium pressure compressor 27, are transferred to the main compressor 22 for recompression to approximately 950 PSIG. The combined vapors are heated by the compression energy. The heated, compressed vapors flow through line 150 to the heat exchanger 17 located in the primary recovery column reboiler 16. In combination with the lowered pressure of the primary solvent recovery column 14, these hot vapors are used to vaporize the $CO_2$ in the primary vapor recompression apparatus 12. The $CO_2$ is finally cooled and condensed in at least one cooler 32 for supply back to the extraction column 10 for reuse as extractant in the ongoing extraction.

Separation purities of the $CO_2$ to the main compressor 22 being cycled through the primary vapor recompression apparatus are unexpectedly, significantly improved. Less organics in the $CO_2$ maximizes purity of the aqueous raffinate from the extractor 10. Furthermore, the purities of extract, in this case acetone, delivered to the extract depressurization drums 24, 26 is unexpectedly, significantly improved. The following table illustrates comparative data for the process and apparatus known in the art and the process and apparatus according to the invention.

Basis for calculations:
10% methanol, 2% acetone in aqueous stream feeding #10 extraction tower in prior art case (DeFilippi). The process and apparatus according to the invention case is 9% methanol, 3% acetone.

$CO_2$ to feed flows at 1.5=1.0 volume ratio

Maximum flows possible with steady state conditions (this means the flows are maximized within the constraints of selected heat exchanger and compressor sizes.

No equipment changes except addition of supplemental reboiler between prior art and comparative present case.

Reflux flow to tower (#14, prior art) and small adjustments to system pressures were made in the present case to ensure recovered $CO_2$ purity was equal or better than prior art case. This actually reduced the gain in capacity somewhat.

| FACTOR | PRIOR | PRESENT |
|---|---|---|
| Tower 14 Pressure (PSIA) | 790 | 740 |
| Reboiler 16 Temp (F) | 79 | 75 |
| Condenser #32 Heat Duty (BTU/hr) | <100,000 | 786,000 |
| Reboiler #20 Heat Duty (BTU/hr) | N/A | 329,000 |
| Reflux to Tower 14 (LB/hr) | 986 | 1972 |
| Stream 110 Flow (LB/hr) | 1798 | 5456 |
| Stream 110 $CO_2$ Conc. (%) | 45 | 74 |
| Stream 130 Flow (LB/hr) | 1798* | 2330 |
| Stream 130 Flow $CO_2$ Conc. (%) | 45 | 41 |
| Extractant Fluid, Stream 20 | | |
| Total Flow (LB/hr) | 8670 | 12268 |
| Methanol PPM | 84890 | 76785 |
| Acetone PPM | 16955 | 25595 |
| Liquid $CO_2$ to Extract Tower 10 | | |
| Total Flow LB/hr | 8009 | 11339 |
| $CO_2$ Purity (Mass Fraction) | .9976 | .9991 |
| Acetone PPM | 1788 | 771 |
| Methanol PPM | 319 | 22 |
| Maximum Feedwater Flowrate | 13.7 | 21.0 |

*in prior art case, stream 110 = stream 130

It should be apparent from the data hereinbefore, that the present case represents a clear improvement over the prior art. $CO_2$ to the extract tower and lower $CO_2$ concentration in the extract stream 130. The above data is not intended to be an optimized design for flowrate or for $CO_2$ purity.

It should be appreciated that the addition of the secondary reboiler 18 and associated heat source, i.e. steam heater 20, requires introduction of controls to maintain stability by maintaining constant conditions in the secondary reboiler liquid(s). Such control is implemented by addition of an associated automatic temperature controller, as known in the art.

Figure 3:
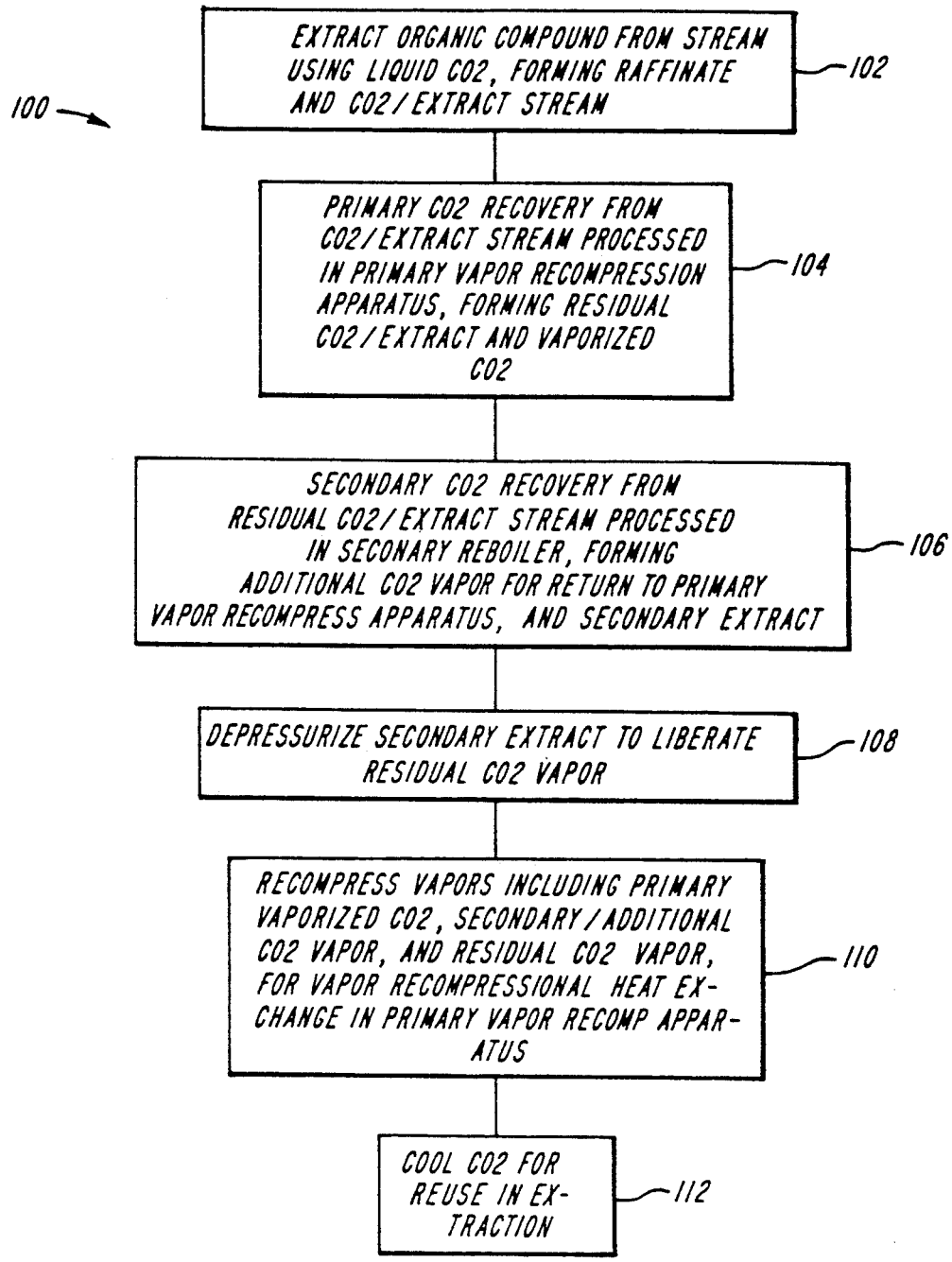
FIG. 3 is a simplified flow diagram of a process for processing organic liquids according to the invention.

Referring now to FIG. 3, a simplified process flow and overview is illustrated, depicting the process according to the invention. The process 100 generally involves extracting 102 organic liquid from an aqueous stream using liquified near or super critical $CO_2$ to form a raffinate and $CO_2$/extract stream. The $CO_2$/extract stream is processed in a primary vapor recompression stage 104, using the system enthalpy to form a primary vaporized $CO_2$ and an extract with residual $CO_2$ (residual $CO_2$/extract). The residual $CO_2$/extract is piped to the secondary reboiler for recovering 106 additional $CO_2$ vapor and secondary purified extract. The secondary purified extract is depressurized 108 to liberate still more residual $CO_2$ vapor, and the purified extract is piped to storage. The primary vaporized $CO_2$, additional $CO_2$ vapor from the secondary reboiler and the residual $CO_2$ vapor from the depressurized extract are recompressed 110 and piped through the primary vapor recompression apparatus for utilization of system enthalpy. Subsequently, the $CO_2$ is cooled 112 for reuse in the extraction column as discussed hereinbefore.

It should be appreciated that although the illustrative embodiment described hereinbefore discussed acetone as an exemplary organic solute, the process and apparatus described herein are applicable in various critical fluid applications and with various solutes that cause solution boiling point elevation.

It should be further noted that the piping for routing liquid in the illustrative embodiment is alternatively configurable, such as to accommodate processing streams that do not require use of the secondary reboiler 18.

While a particular interconnection and piping scheme is presented in the illustrative embodiment disclosed, it will be appreciated by those of ordinary skill in the art that alternative interconnections and piping schemes can be implemented.

Additionally, although specifications are provided herein for a secondary reboiler suited to the illustrative embodiment disclosed it will be appreciated that alternative reboiler designs and/or alternative external energy sources, such as non-steam heat sources, can be implemented.

Although the invention has been shown and described with respect to an illustrative embodiment thereof, it should be appreciated that the foregoing and various other changes, omissions and additions in the form and detail thereof may be made without departing from the spirit and scope of the invention a delineated in the claims.

What is claimed is:

1. A process for extracting at least one organic liquid from a mixture including an aqueous portion and said at least one organic liquid, said process comprising the steps of:
   contacting said mixture with a near or super critical solvent to extract said at least one organic liquid from said mixture and to form a raffinate comprising at least a portion of said aqueous portion and a solvent/extract stream;
   processing said solvent/extract stream in a primary vapor recompression apparatus to vaporize and separate said solvent from said solvent/extract stream and to form a vaporized solvent and a residual solvent/extract stream;
   processing said residual solvent/extract stream in a secondary reboiler to vaporize and separate said solvent from said residual solvent/extract stream and to form additional vaporized solvent and organic liquid extract;
   recompressing said vaporized solvent and said additional vaporized solvent to form a recompressed vapor; and
   conveying said recompressed vapor to said primary vapor recompression apparatus to provide energy to vaporize and separate said solvent from said solvent/extract stream and to form a vaporized solvent and a residual solvent/extract stream.

2. The process of claim 1 further comprising the steps of,
   depressurizing said organic liquid extract to liberate residual solvent vapor therefrom for recompressing along with said vaporized solvent and said additional vaporized solvent to form said recompressed vapor; and
   cooling said recompressed vapor to form a recycled solvent to use with said near or super critical solvent to extract said at least one organic liquid from said mixture and to form a raffinate comprising at least a portion of said aqueous portion and a solvent/extract stream.

3. An apparatus for extracting at least one organic liquid from a mixture including an aqueous portion and said at least one organic liquid, comprising:
   an extraction apparatus receiving said mixture and facilitating contact of said mixture with a near or super critical solvent to extract said at least one organic liquid from said mixture and to form a raffinate comprising at least a portion of said aqueous portion, and a solvent/extract stream;
   a primary vapor recompression apparatus receiving said solvent/extract stream in a portion of said primary vapor recompression apparatus from said extraction apparatus and vaporizing and separating said solvent from said solvent/extract stream and forming a vaporized solvent and a residual solvent/extract stream;
   a secondary reboiler, receiving said residual solvent/extract stream from said primary vapor recompression apparatus and vaporizing and separating said solvent from said residual solvent/extract stream and forming additional vaporized solvent and organic liquid extract;
   at least one compressor receiving said vaporized solvent from said primary vapor recompression apparatus and said additional vaporized solvent from said secondary reboiler and compressing said vaporized solvent and said additional vaporized solvent to form a recompressed vapor;
   wherein said recompressed vapor is conveyed from said at least one compressor to said primary vapor recompression apparatus to provide energy to vaporize and separate said solvent from said solvent/extract stream and to form a vaporized solvent and a residual solvent/extract stream.

4. The apparatus of claim 3 further comprising at least one flash drum receiving said organic liquid extract from said secondary reboiler and depressurizing said organic liquid extract to liberate residual solvent vapor therefrom for recompressing along with said vaporized solvent and said additional vaporized solvent to form said recompressed vapor; and
   at least one condenser, receiving said recompressed vapor and cooling said recompressed vapor to form a recycled solvent to use with said near or super critical solvent to extract said at least one organic liquid from said mixture and to form a raffinate comprising at least a portion of said aqueous portion and a solvent/extract stream

* * * * *

UNITED STATES PATENT AND TRADEMARK OFFICE
CERTIFICATE OF CORRECTION

PATENT NO. : 5,312,549
DATED : May 17, 1994
INVENTOR(S) : Darrell String et al

It is certified that error appears in the above-indentified patent and that said Letters Patent is hereby corrected as shown below:

Column 3, line 36, "panagoitopoulos" should read --Panagoitopoulos--.

Column 4, line 67, "$CO_2$flows" should read --$CO_2$ flows--.

Column 6, line 49, "$CO_2$ to the extract tower and lower $CO_2$ concentration in the extract stream 130." should read --Note the higher maximum flowrate of feedwater, improved purity of $CO_2$ to the extract tower and lower $CO_2$ concentration in the extract stream 130.--.

Signed and Sealed this

Eighth Day of November, 1994

Attest:

BRUCE LEHMAN

Attesting Officer — Commissioner of Patents and Trademarks